(12) United States Patent
Saberan

(10) Patent No.: US 7,044,555 B2
(45) Date of Patent: May 16, 2006

(54) AUTOMOTIVE SEAT ASSEMBLY WITH STOWABLE HEADREST

(75) Inventor: Mohammad Saberan, New Baltimore, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/709,750

(22) Filed: May 26, 2004

(65) Prior Publication Data

US 2005/0264078 A1 Dec. 1, 2005

(51) Int. Cl.
*B40N 2/48* (2006.01)
*A47C 1/10* (2006.01)

(52) U.S. Cl. .................... 297/408; 297/378.12
(58) Field of Classification Search .............. 297/61, 297/378.12
See application file for complete search history.

(56) References Cited

U.S. PATENT DOCUMENTS

| | | | | |
|---|---|---|---|---|
| 4,350,389 A * | 9/1982 | Parsson et al. | ............. | 297/410 |
| 4,657,297 A * | 4/1987 | Ishibashi | .............. | 296/63 |
| 5,346,277 A | 9/1994 | Holobaugh | | |
| 5,466,043 A * | 11/1995 | Lambert et al. | ............. | 297/238 |
| 5,520,435 A | 5/1996 | Fujimoto | | |
| 5,681,077 A * | 10/1997 | Hashimoto | .............. | 297/15 |
| 5,681,079 A | 10/1997 | Robinson | | |
| 5,738,411 A * | 4/1998 | Sutton et al. | .......... | 297/378.12 |
| 5,823,619 A * | 10/1998 | Heilig et al. | ........... | 297/216.12 |
| 6,050,633 A | 4/2000 | Droual | | |
| 6,192,565 B1 * | 2/2001 | Tame | ............ | 297/61 |
| 6,450,579 B1 * | 9/2002 | Nylander et al. | ........ | 297/378.1 |
| 6,550,856 B1 * | 4/2003 | Ganser et al. | ................ | 297/61 |
| 6,612,653 B1 * | 9/2003 | Takata | ........................ | 297/408 |
| 6,663,181 B1 | 12/2003 | Nygren | | |
| 6,709,051 B1 * | 3/2004 | Schambre et al. | ............ | 297/61 |
| 6,779,839 B1 * | 8/2004 | Andreasson et al. | .......... | 297/61 |
| 6,796,613 B1 * | 9/2004 | Klink et al. | ................ | 297/410 |
| 6,860,564 B1 * | 3/2005 | Reed et al. | ................. | 297/408 |
| 2002/0079723 A1 | 6/2002 | Risch | | |
| 2003/0098596 A1 | 5/2003 | Andreasson | | |
| 2004/0026964 A1 | 2/2004 | Edrich | | |

OTHER PUBLICATIONS

WO 94/01302, Skogward, Kenneth, "Neck Protection for Foldable Back Support of a Vehicle."*

* cited by examiner

*Primary Examiner*—Peter M. Cuomo
*Assistant Examiner*—Sarah B. McPartlin
(74) *Attorney, Agent, or Firm*—Earl LaFontaine, Esq.

(57) ABSTRACT

An assembly for use in an automobile is provided including an automotive seat element including a seatback element having a seatback forward face, a seatback top face, and a seatback rearward face. The seatback rotates between a use position and a folded position and includes a mounting structure. The lower pivot end, of a pivot structure, is rotatably mounted to the mounting structure having a pivot structure storage position and a pivot structure use position. The pivot structure extends vertically upward in the pivot structure use position. The upper pivot end rotates forward to a pivot structure storage position. A headrest inner structure rotates at the upper pivot end, extends on a downward angle, is covered by a headrest outer structure having a head engagement surface. The headrest inner structure rotates away from the seatback so the headrest slides down the seatback face into the pivot structure storage position.

10 Claims, 2 Drawing Sheets

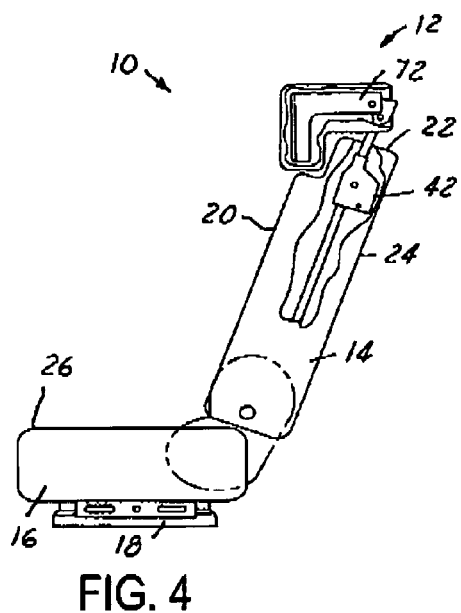 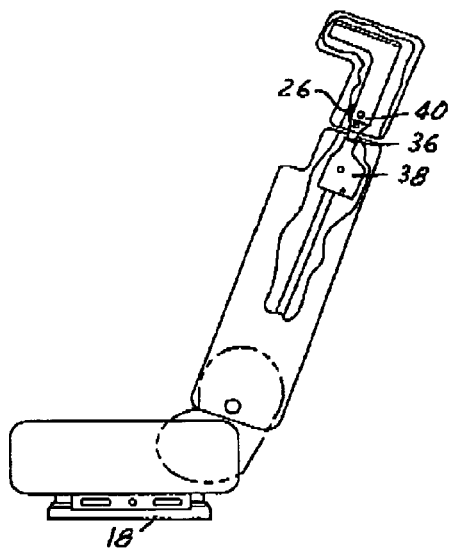
FIG. 4　　　FIG. 5
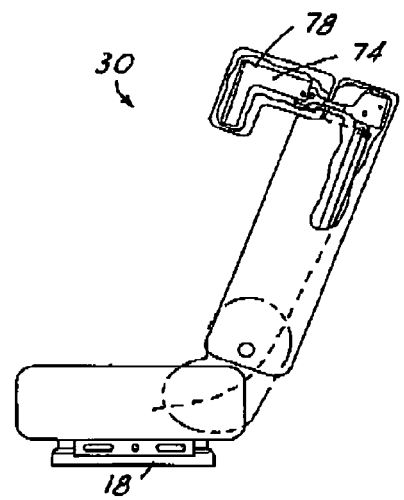 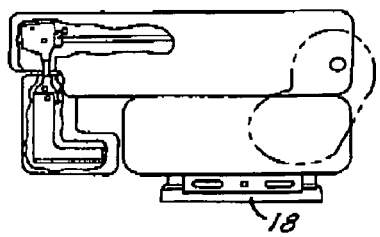
FIG. 6　　　FIG. 7

AUTOMOTIVE SEAT ASSEMBLY WITH STOWABLE HEADREST

BACKGROUND OF INVENTION

The present invention relates generally to an automotive seat assembly and more particularly to an automotive seat assembly with improve storage characteristics and profile.

Automotive design considerations must often encompass a wide variety of tasks and applications for a single assembly. The multiple task assemblies are a reflection of the ever-increasing utility consumer's expect out of their vehicles. One common assembly subject to this philosophy is automotive seating. Automotive seating assemblies, especially rear-seating assemblies, must often be designed to fold down or stow away such that when they are not in use the consumer is provided with extended storage throughout the vehicle interior. For many automotive platforms, the storage of seating assemblies is virtually mandatory.

Although the stowability of seating structures may be required by way of design mandates, the seat assemblies themselves are of not-inconsiderable bulk. The seat assemblies must be designed in addition for their primary purpose, namely the comfort and safety of passengers using them for seating. Thus the ability to adequately stow the seat assemblies can become considerably challenging. Often designs require, at a minimum, that the seat back portion of the seat assembly be capable of being folded down against the seating portion of the seat assembly such that a nearly flat surface is obtained. Although the concept may appear simple enough, the complex features of modern seating often create design challenges to achieving this simple operation.

One of such challenges arises from the use of headrest assemblies that protrude from the seatback portion. These headrest assemblies commonly protrude vertically upward from the top of the seatback portion such that they provide head support to passengers during normal operations and vehicle impact. The headrest assemblies play a vital role in protecting occupant health. Unfortunately, present headrest assemblies additionally play a role in generating design challenges for storable seatbacks. When a seatback is folded down, the headrest assemblies often interfere with any seats positioned in from of the folded seatback. This can prevent sufficient folding of the seatback and may place undue stresses on the headrest assembly. The utilization of removable headrests adds undue complications to consumers and therefore is also undesirable. Headrests that fold backwards from the seatback top allow improved folding of the seatback, but in turn utilize areas of the automotive interior that would otherwise be suitable for storage. Thus this design is inefficient.

What is needed is an improved automotive seat assembly/automotive headrest assembly that would simplify and improve seatback storage functionality. Additionally, it would be highly desirable to have such an automotive seat assembly wherein the storage efficiency of the vehicle interior is maximized when the seatback is folded into the seatback folded position.

SUMMARY OF INVENTION

It is, therefore, an object of the present invention to provide an automotive seat assembly with improved storage characteristics. It is a further object of the present invention to provide an automotive seat assembly with a storable headrest assembly to improve storage characteristics.

An automotive seat assembly for use in an automobile is provided. The assembly includes an automotive seat element including a seatback element having a seatback forward face, a seatback top face, and a seatback rearward face. The seatback element is rotatable between a seatback use position and a seatback folded position. The seat element includes a seat base element comprising a seat base top face. A headrest mounting structure is positioned within the seatback element. A pivot structure is included having a lower pivot end and an upper pivot end. The lower pivot end rotatably is mounted to the headrest mounting structure and is rotatable about the lower pivot end between a pivot structure storage position and a pivot structure use position. The pivot structure extends vertically upward from the seatback top face when in the pivot structure use position. The upper pivot end rotates forward to reach the pivot structure storage position. A headrest inner structure is rotatably engaged to the upper pivot end and extends on a downward angle from the upper pivot end. A headrest outer structure covers the headrest inner structure and includes a head engagement surface. The headrest inner structure is rotatable away from the seatback element such that as the pivot structure rotates into the pivot structure storage position, the headrest outer structure slides down along the seatback forward face.

Other objects and features of the present invention will become apparent when viewed in light of the detailed description of the preferred embodiment when taken in conjunction with the attached drawings and appended claims.

BRIEF DESCRIPTION OF DRAWINGS

FIG. 4 is an illustration of an alternate embodiment of an automotive seat assembly in accordance with the present invention, the seat assembly illustrated in a seatback use position.

FIG. 5 is an illustration of the automotive seat assembly illustrated in FIG. 4, the seat assembly illustrated in a first intermediate storage position.

FIG. 6 is an illustration of the automotive seat assembly illustrated in FIG. 4, the seat assembly illustrated in a second intermediate storage position.

FIG. 7 is an illustration of the automotive seat assembly illustrated in FIG. 4, the seat assembly illustrated in a seatback folded position.

DETAILED DESCRIPTION

Figure 1:
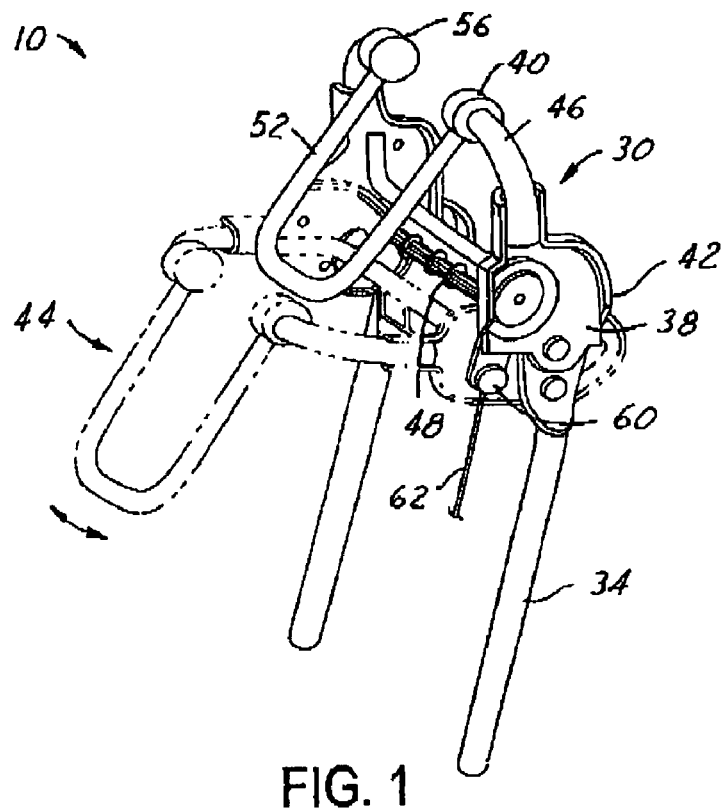
FIG. 1 is an illustration of an internal portion of an automotive seat assembly in accordance with the present invention.
Figure 2:
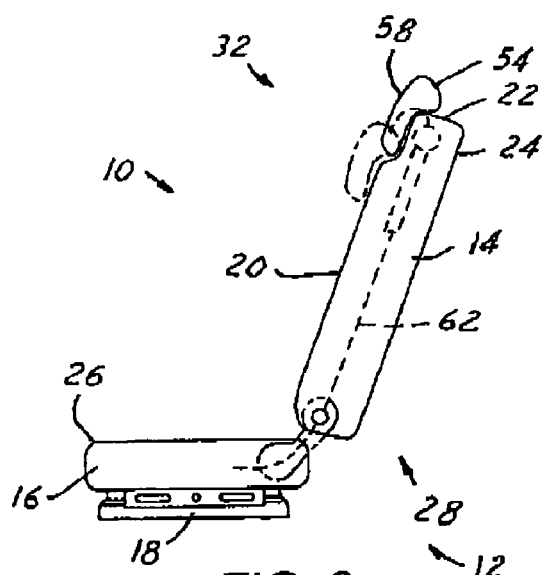
FIG. 2 is an illustration of the automotive seat assembly illustrated in FIG. 1, the seat assembly illustrated in a seatback use position.

Referring not to FIGS. 1 and 2 which are an illustration of an automotive seat assembly 10 in accordance with the present invention. The automotive seat assembly 10 is illustrated in limited embodiments, however, a plurality of modifications will become obvious to one skilled in the art in light of the present disclosure. The automotive seat assembly includes an automotive seat element 12 comprised of a seatback element 14 and a seatbase element 16. The seatback element 14 is rotatably engaged to the seatbase element 16 for storage. The seatback element 14 is commonly mounted to a seatbase track 18 to allow for positional adjustment once installed in an automobile.

Figure 3:
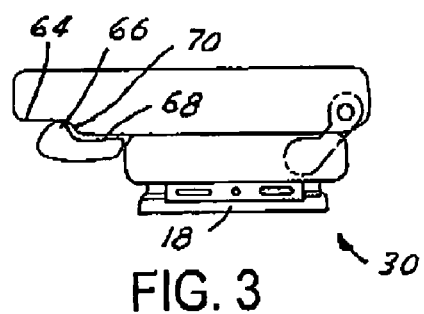
FIG. 3 is an illustration of the automotive seat assembly illustrated in FIG. 2, the seat assembly illustrated in a seatback storage position.

The seatback element 14 includes a seatback forward face 20, a seatback top face 22, and a seatback rearward face 24. The seat base element 16, in turn, is comprised of a seat base top face 26. As mentioned, the seatback element 14 is rotatably engaged to the seat base element 16 such that the seatback element 14 is movable between a seatback use position 28 (see FIG. 2) and a seatback folded position 30 (see FIG. 3). This allows the seatback rearward face 24 to provide and extended storage surface for automotive consumers when the seat element 12 is not otherwise occupied by an occupant. Although such seatback folding actuation is known in the prior art, the present invention contemplates a more cohesive and efficient actuation to further involve storage of the headrest assembly 30 mounted on the seatback element 14.

The headrest assembly 32 is comprised of a headrest mounting structure 34 positioned within and mounted to the seatback element 14. Although a variety of headrest mounting structures 34 are contemplated, the present embodiment contemplates the use of a dual tubular mounting structure. Rotatably engaged to the headrest mounting structure 34 is a pivot structure 36 having a lower pivot end 38 and an upper pivot end 40. The lower pivot end 38 is rotatably mounted to the headrest mounting structure 34. The pivot structure 36 rotates about the lower pivot end 38 such that it can move between a pivot structure use position 42 and a pivot structure storage position 44. The pivot structure 36 extends vertically upward from the seatback top face 22 when in the pivot structure use position 40 and rotates forward to reach the pivot structure storage position 44. Although the pivot structure 36 may comprise a wide variety of functional forms, one embodiment contemplates the use of inwardly arching pivot arms 46 to form the pivot structure 36. In addition, it is contemplated that the pivot structure 36 is preferably biased towards the pivot structure storage position 42. This may be accomplished in a variety of fashions, however, one embodiment contemplates the use of a lower biasing spring 48.

Attached to the pivot structure 36 is a headrest inner structure 50. Although alternate physical embodiments may be substituted, one preferred embodiment contemplates the use of a u-shaped support 52 for the headrest inner structure 50. The headrest inner structure 50 is rotatably engaged to the upper pivot end 40 of the pivot structure 36. The headrest inner structure 50 extends downward on an angle from the upper pivot end 40 when the pivot structure 36 is in the pivot structure storage position 42. The headrest inner structure 50 is preferably biased to rotate towards the seatback forward face 20 to thereby keep the headrest outer structure 54, surrounding the headrest inner structure 50, in constant contact with the seatback forward face 50. It is contemplated that an upper basing spring 56 may be utilized on the upper pivot end 40 to so dispose the headrest inner structure 50. It is further contemplated that the headrest inner structure 50 may be allowed to be rotatable away from the seatback forward face 20 to a limited degree. In this fashion, as the pivot structure 36 rotates into the pivot structure storage position 44, the headrest outer structure 54 slides downward along the seatback forward face 20. Additionally, it is contemplated that the head engagement surface 58 of the headrest outer structure 54 remains parallel to and extends outward from the seatback forward face 20 when in the pivot structure storage position 44. In this fashion, the headrest outer structure 54 will protrude into a users back when the seatback element 16 is returned into the seatback use position 28. This will prompt a manual return of the headrest assembly 32 into the pivot structure use position 42.

In addition, it is contemplated a lower pivot locking element 60 may be in communication with the lower pivot end 38. This allows the headrest assembly 32 to be secured in the pivot structure use position 42 during use. A trigger, such as an actuator cable 62, may disengage the lower pivot locking element 60 in response to the seatback forward face 20 moving into the seatback folded position 30. The biasing of the pivot structure 36 and the headrest inner structure 50, in response to the disengagement, slide the headrest assembly 32 downwards along the seatback forward face 20 keeping the head engagement surface 58 approximately parallel to the seatback forward face 20. The headrest assembly 32 preferably remains in such a state until manually returned to a use position by an occupant after returning the seatback element 14 to the seatback use position 28. Upon manually returning the headrest assembly 32, the lower pivot locking element 60 re-engages and retains the headrest assembly 32 in the use position.

The seatback element 14 may further include an indentation 64 formed in the seatback forward face 20 adjacent the seatback top face 22. This generates a pocket within which the headrest assembly 32 sits and travels. By including a headrest protrusion 66 on the rearward headrest face 68, the headrest protrusion may be utilizing to engage the lower position of the indentation 64 to limit travel of the headrest assembly 32 by impacting a lower indentation face 70. Additionally, the indentation 64 limits the profile of the headrest outer structure when in the pivot structure storage position 44. The headrest outer structure 54 is preferably, when in storage position 44, completely contained between the seatback top face 22 an the seat base element 16 such that it does not interfere with any surrounding structure.

An additional embodiment is illustrated in FIGS. 4–7. This embodiment functions identically to the previously described embodiment with a few additional features. The headrest inners structure 50 is movable between an inner structure use position 72 and an inner structure storage position 74. The headrest inner structure 50 is preferably biased toward the inner structure storage position 74. This embodiment further includes an upper pivot locking element 76. The upper pivot locking element can be disengaged similar to the lower pivot locking element 60. Once disengaged, the headrest inner structure 50 pivots about the upper pivot end 40 until it is parallel with the pivot structure 36. Then as the pivot structure 36 rotates forward into the pivot structure storage position 44, the headrest inner structure 50 becomes perpendicular to the headrest mounting structure 34. This, in addition to an L-shaped structure 78 for use as the headrest outer structure 54, allows a larger headrest outer structure 54 to be utilized while still insuring that the headrest outer structure 54 does not protrude past the seatback top face 22 when the seatback element 14 is in the seatback folded position 30.

While particular embodiments of the invention have been shown and described, numerous variations and alternative embodiments will occur to those skilled in the art. Accordingly, it is intended that the invention be limited only in terms of the appended claims.

The invention claimed is:

1. An automotive seat assembly for use in an automobile comprising:
   an automotive seat element comprising:
   a seatback element comprising a seatback forward face, a seatback top face, and a seatback rearward face, said seatback element rotatable between a seatback use position and a seatback folded position; and a seatbase element comprising a seatbase top face;

a headrest mounting structure positioned within said seatback element;

a pivot structure having a lower pivot end and an upper pivot end, said lower pivot end rotatably mounted to said headrest mounting structure, said pivot structure rotatable about said lower pivot end between a pivot structure storage position and a pivot structure use position, said pivot structure extending vertically upward from said seatback top face when in said pivot structure use position, said upper pivot end rotating forward about said lower pivot end to reach said pivot structure storage position;

a headrest inner structure rotatably engaged to said upper pivot end, said headrest inner structure extending on a downward angle from said upper pivot end;

a headrest outer structure covering said headrest inner structure, said headrest outer structure comprising a head engagement surface, said headrest inner structure rotatable away from said seatback element such that as said pivot structure rotates into said pivot structure storage position, said headrest outer structure slides down along said seatback forward face, said head engagement surface remains parallel to said seatback forward face as said pivot structure rotates into said pivot structure storage position.

2. An automotive seat assembly as described in claim 1, wherein said headrest inner structure comprises:
a u-shaped support ending extending downward from said upper pivot end.

3. An automotive seat assembly as described in claim 1, wherein said upper pivot end biases said head engagement surface towards said seatback forward face.

4. An automotive seat assembly as described in claim 1, wherein:
said pivot structure is biased towards said pivot structure storage position;
said pivot structure lockable using a lower pivot locking element into said pivot structure use position; and
said lower pivot locking element disengaging said pivot structure in response to said seatback element moving into said seatback folded position.

5. An automotive seat assembly as described in claim 1, further comprising:
an indentation formed in said seatback forward face adjacent said seatback top face, said headrest outer structure movable within said indentation as said pivot structure moves between said pivot structure use position and said pivot structure storage position.

6. An automotive seat assembly as described in claim 5, wherein said headrest outer structure includes a headrest rear protrusion, said headrest rear protrusion engaging a lower indentation face of said indentation when said pivot structure is in said pivot structure storage position.

7. An automotive seat assembly as described in claim 1, wherein said pivot structure comprises a pair of inwardly arched pivot arms.

8. An automotive seat assembly as described in claim 1, wherein said head engagement surface protrudes from said seatback forward face when in said pivot structure storage position, said protruding prompting manual return to said pivot structure use position when said seatback element is returned to said seatback use position.

9. An automotive seat assembly for use in an automobile comprising:

an automotive seat element comprising:

a seatback element comprising a seatback forward face, a seatback top face, and a seatback rearward face, said seatback element rotatable between a seatback use position and a seatback folded position; and a seatbase element comprising a seatbase top face;

a headrest mounting structure positioned within said seatback element;

a pivot structure having a lower pivot end and an upper pivot end, said lower pivot end rotatably mounted to said headrest mounting structure, said pivot structure rotatable about said lower pivot end between a pivot structure storage position and a pivot structure use position, said pivot structure extending vertically upward from said seatback top face when in said pivot structure use position, said upper pivot end rotating forward about said lower pivot end to reach said pivot structure storage position;

a headrest inner structure rotatably engaged to said upper pivot end, said headrest inner structure extending on a downward angle from said upper pivot end;

a headrest outer structure covering said headrest inner structure, said headrest outer structure comprising a head engagement surface, said headrest inner structure rotatable away from said seatback element such that as said pivot structure rotates into said pivot structure storage position, said headrest outer structure slides down along said seatback forward face, wherein said headrest outer structure is completely located between said seatback top face and said seatbase element when said seatback element is in said seatback folded position.

10. A method of storing an automotive seat assembly comprising:
folding a seatback element from a seatback use position to a seatback folded position;
releasing a lower pivot locking element in response to said seatback element moving into said seatback folded position;
pivoting a pivot structure about said lower pivot end from a pivot structure use position to a pivot structure storage position in response to releasing said lower pivot locking element, said pivot structure biased towards said pivot structure storage position such that said pivot structure rotates forward about said lower pivot end upon release of said lower pivot locking element;
sliding a headrest outer structure downward along a seatback forward face in response to said pivot structure moving into said pivot structure storage position, said headrest outer structure positioned around a headrest inner structure rotatably engaged to an upper pivot end of said pivot structure, said headrest inner structure extending on a downward angle from said upper pivot end, said headrest outer structure rotatable about said lower pivot end away from said seatback element such that as said pivot structure rotates into said pivot structure storage position said headrest outer structure slides down along a seatback forward face wherein said headrest outer structure is completely located between a seatback top face and a seat base element when said seatback element is in said seatback folded position.

* * * * *